(12) United States Patent
Huang et al.

(10) Patent No.: US 10,606,103 B2
(45) Date of Patent: Mar. 31, 2020

(54) CONCAVE DISPLAY

(71) Applicant: GIANTPLUS TECHNOLOGY CO., LTD, Miaoli County (TW)

(72) Inventors: Chih-Teng Huang, Taoyuan (TW); Hsin-Yu Han, Taoyuan (TW); He-Guei Chen, New Taipei (TW); Hsiao-Ching Shen, Taoyuan (TW)

(73) Assignee: GIANTPLUS TECHNOLOGY CO., LTD, Miaoli County (TW)

( * ) Notice: Subject to any disclaimer, the term of this patent is extended or adjusted under 35 U.S.C. 154(b) by 325 days.

(21) Appl. No.: 15/700,201

(22) Filed: Sep. 11, 2017

(65) Prior Publication Data
US 2018/0149888 A1    May 31, 2018

(30) Foreign Application Priority Data
Nov. 28, 2016   (TW) .............................. 105218167 U (51) Int. Cl.
  *G02F 1/1335*   (2006.01)
  *G02F 1/01*     (2006.01)
  *G02B 27/00*    (2006.01)
  *G02B 5/20*     (2006.01)
  *G02F 1/19*     (2019.01)

(52) U.S. Cl.
  CPC ............ *G02F 1/0102* (2013.01); *G02B 5/20* (2013.01); *G02B 27/0018* (2013.01); *G02F 1/133524* (2013.01); *G02F 1/19* (2013.01); *G02B 5/201* (2013.01); *G02F 1/133553* (2013.01); *G02F 2001/133562* (2013.01); *G02F 2001/133567* (2013.01)

(58) Field of Classification Search
  CPC ........................... G02F 1/133305; G09F 9/301
  See application file for complete search history.

(56) References Cited

U.S. PATENT DOCUMENTS

| | | | | |
|---|---|---|---|---|
| 9,081,225 B2 * | 7/2015 | Ohshima | ........... | G02F 1/133526 |
| 2006/0268418 A1 * | 11/2006 | Kim | ...................... | G02B 6/0053 |
| | | | | 359/618 |
| 2006/0291243 A1 * | 12/2006 | Niioka | ..................... | G02B 3/08 |
| | | | | 362/607 |
| 2008/0144179 A1 * | 6/2008 | Mimura | ................. | G02B 5/005 |
| | | | | 359/599 |

(Continued)

FOREIGN PATENT DOCUMENTS

TW         201543115        11/2015

*Primary Examiner* — Andrew J Coughlin
(74) *Attorney, Agent, or Firm* — JCIPRNET (57) ABSTRACT

A concave display including a first substrate, a second substrate, a display medium, a color filter layer, an optical film and an active device layer is provided. The second substrate is disposed opposite to the first substrate. The display medium is disposed between the first substrate and the second substrate. The color filter layer is disposed on the first substrate. The active device layer is disposed on the first substrate or the second substrate. The optical film is disposed on the first substrate. The optical film is further away from the display medium than the color filter. The optical film includes a base material and optical microstructures embedded in the base material, wherein a refractive index of each of the optical microstructures is smaller than a refractive index of the base material.

13 Claims, 5 Drawing Sheets

(56) References Cited

U.S. PATENT DOCUMENTS

2011/0241573 A1* 10/2011 Tsai .................... G02B 6/0036
315/312
2011/0255039 A1 10/2011 Enomoto
2014/0111736 A1* 4/2014 An .................... G02F 1/133305
349/58

* cited by examiner

CONCAVE DISPLAY

CROSS-REFERENCE TO RELATED APPLICATION

This application claims the priority benefit of Taiwan application serial no. 105218167, filed on Nov. 28, 2016. The entirety of the above-mentioned patent application is hereby incorporated by reference herein and made a part of this specification.

BACKGROUND OF THE INVENTION

Field of the Invention

The invention relates to a display, and particularly relates to a concave display.

Description of Related Art

Along with development of technology, the application of curved displays is more and more extensive. For example, the curved displays have been widely applied in wearable devices, mobile phones, televisions, etc. Devices that are often used in daily life may all be installed with the curved surfaces, which represents a great market potential of the curved displays. The curved displays include convex displays and concave displays. A display surface of the convex display protrudes towards a user. A display surface of the concave display is recessed towards a direction away from the user. However, in the conventional concave display, lights emitted from both sides of the concave display are concentrated to the center to cause problems such as color mixing, rainbow stripes, display brightness unevenness, etc., which causes quality decrease of the concave display.

SUMMARY OF THE INVENTION

The invention is directed to a concave display, which has a good performance.

The invention provides a concave display including a first substrate, a second substrate, a display medium, a color filter layer, an optical film and an active device layer. The second substrate is disposed opposite to the first substrate. The display medium is disposed between the first substrate and the second substrate. The color filter layer is disposed on the first substrate. The active device layer is disposed on the first substrate or the second substrate. The optical film is disposed on the first substrate, and the optical film is farther away from the display medium than the color filter layer. The optical film includes a base material and optical microstructures embedded in the base material, where a refractive index of each of the optical microstructures is smaller than a refractive index of the base material.

In an embodiment of the invention, at least a part of the optical microstructures are not parallel to each other.

In an embodiment of the invention, the first substrate has a first concave surface, the first concave surface has a first lowest point and a first edge and a second edge respectively located at two opposite sides of the first lowest point. The optical microstructures include a plurality of first optical microstructures and a plurality of second optical microstructures. The first optical microstructures are located between the first edge and the first lowest point and are inclined from the first lowest point toward the first edge. The second optical microstructures are located between the second edge and the first lowest point and are inclined from the first lowest point toward the second edge.

In an embodiment of the invention, the second substrate, the display medium and the first substrate are sequentially stacked in a first direction. Each of the first optical microstructures and the first direction include an angle $\alpha 1$. The angle $\alpha 1$ is increased as the first optical microstructure is away from the first lowest point. Each of the second optical microstructures and the first direction include an angle $\alpha 2$. The angle $\alpha 2$ is increased as the second optical microstructure is away from the first lowest point.

In an embodiment of the invention, the second substrate, the display medium and the first substrate are sequentially stacked in a first direction, and the optical microstructures further include a plurality of third optical microstructures. The third optical microstructures are located in a region where the first lowest point is located, where each of the third optical microstructures is substantially parallel to the first direction.

In an embodiment of the invention, the first substrate has a first concave surface, the first concave surface has a first lowest point, and a distribution density of the optical microstructures in a region away from the first lowest point is greater than a distribution density of the optical microstructures in a region close to the first lowest point.

In an embodiment of the invention, the concave display further includes a reflective layer. The reflective layer is disposed on the second substrate. The reflective layer includes a plurality of reflective microstructures. The reflective microstructures respectively have a plurality of reflective surfaces, and at least a part of the reflective surfaces are inclined relative to the second substrate.

In an embodiment of the invention, the second substrate, the display medium and the first substrate are sequentially stacked in the first direction, the second substrate has a second concave surface, the second concave surface has a second lowest point and a third edge and a fourth edge respectively located at two opposite sides of the second lowest point. The reflective microstructures include a plurality of first reflective microstructures and a plurality of second reflective microstructures. The first reflective microstructures are located between the third edge and the second lowest point. Each of the first reflective microstructures has a first reflective surface, and the first reflective surface faces an edge of the concave display. The second reflective microstructures are located between the fourth edge and the second lowest point. Each of the second reflective microstructures has a second reflective surface, and the second reflective surface faces the edge of the concave display.

In an embodiment of the invention, the first reflective surface and the second substrate include an angle $\beta 1$, and the angle $\beta 1$ is increased as the first reflective microstructure is away from the second lowest point. The second reflective surface and the second substrate include an angle $\beta 2$. The angle $\beta 2$ is increased as the second reflective microstructure is away from the second lowest point.

In an embodiment of the invention, the reflective microstructures further include a plurality of third reflective microstructures. The third reflective microstructures are located in a region where the second lowest point is located, where each of the third reflective microstructures has a third reflective surface, and the third reflective surface is substantially parallel to the second substrate.

In an embodiment of the invention, a distribution density of the reflective microstructures in a region away from the second lowest point is greater than a distribution density of the reflective microstructures in a region close to the second lowest point.

According to the above description, the concave display of an embodiment of the invention includes the optical film. The optical film includes a base material and a plurality of optical microstructures respectively embedded in the base material, where a refractive index of each of the optical microstructures is smaller than a refractive index of the base material. When a light emitting from the display medium of the concave display passes through the optical film, the light is deflected by the optical film, such that the light originally concentrated to the center of the concave display is adjusted to be deflected towards the edge of the display panel. In this way, the problems of the conventional technique such as color mixing, rainbow stripes, display brightness unevenness, etc., can be mitigated.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
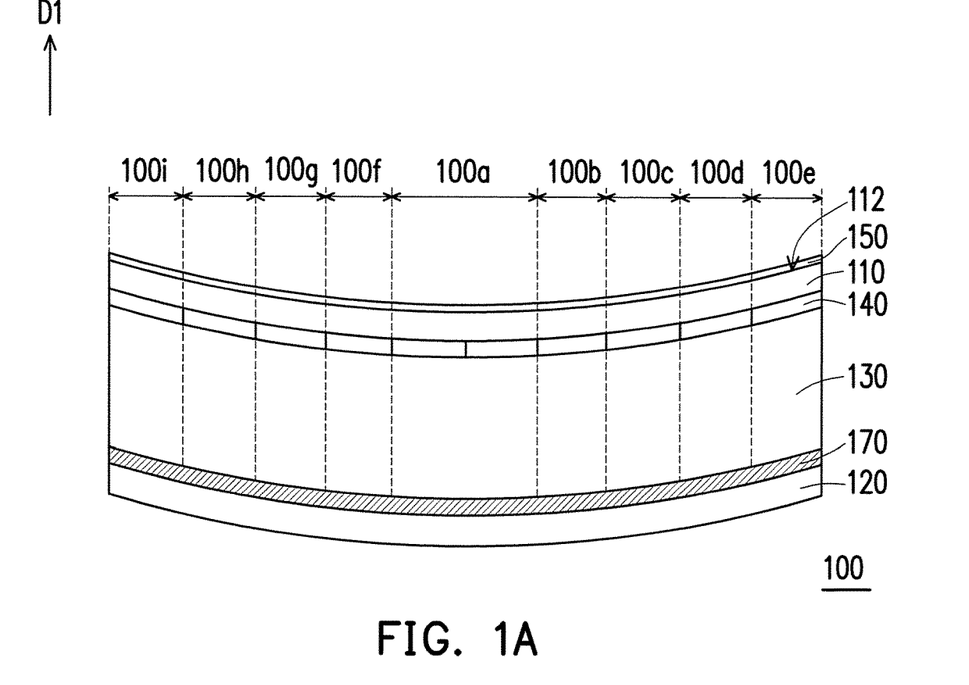
FIG. 1A is a cross-sectional view of a concave display according to an embodiment of the invention.
Figure 1B:
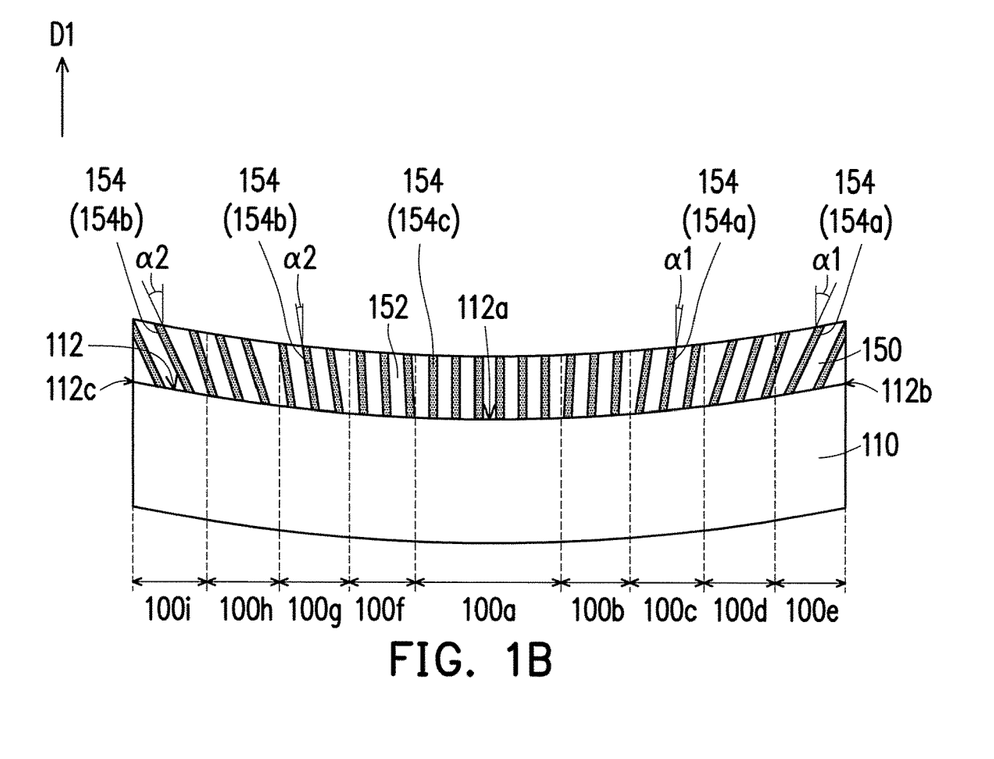
FIG. 1B is a cross-sectional view of a first substrate and an optical film of the concave display of FIG. 1A.

FIG. 1A is a cross-sectional view of a concave display according to an embodiment of the invention. FIG. 1B is a cross-sectional view of a first substrate and an optical film of the concave display of FIG. 1A. Referring to FIG. 1A and FIG. 1B, the concave display 100 includes a first substrate 110, a second substrate 120, a display medium 130, a color filter layer 140, an optical film 150 and an active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152, where a refractive index of each of the optical microstructures 154 is smaller than a refractive index of the base material 152. In the present embodiment, the display medium 130 is, for example, liquid crystal, though the invention is not limited thereto, and in other embodiments, the display medium 130 may also be other suitable material, for example, an organic electroluminescent layer, etc.

In the present embodiment, the active device layer 170 may be selectively disposed on the second substrate 120, and is located between the second substrate 120 and the display medium 130. However, the invention is not limited thereto, and in other embodiment, the active device layer 170 may also be disposed on the first substrate 110, which is described below with reference of other figures in subsequent paragraphs. For example, in the present embodiment, the active device layer 170 includes a plurality of thin-film transistors (TFTs, not shown), a plurality of scan lines electrically connected to gates of the TFTs, a plurality of data lines electrically connected to sources of the TFTs and a plurality of pixel electrodes electrically connected to drains of the TFTs. However, the invention is not limited thereto, and in other embodiment, the active device layer 170 may also include other proper components.

Referring to FIG. 1A, in the present embodiment, the color filter layer 140 is located at an inner side of the first substrate 110, and the optical film 150 may be located at an outer side of the first substrate 110. In other words, the first substrate 110, the second substrate 120 and the display medium 130 form a cell, and the optical film 150 may be located outside the cell. However, the invention is not limited thereto, and in other embodiment, the optical film 150 may also be located at the inner side of the first substrate 110. To be specific, the optical film 150 may be located between the first substrate 110 and the color filter layer 140. In other words, in other embodiment, the optical film 150 may be located within the cell.

Referring to FIG. 1B, in the present embodiment, the optical film 150 includes a plurality of optical microstructures 154. The optical microstructures 154 are arranged on a first concave surface 112 of the first substrate 110. At least a part of the optical microstructures 154 are not parallel with each other. To be specific, the optical microstructures 154 include a plurality of first optical microstructures 154a, a plurality of second optical microstructures 154b and a plurality of optical microstructures 154c. The first substrate 110 has the first concave surface 112. The first concave surface 112 has a first lowest point 112a and a first edge 112b and a second edge 112c respectively located at two opposite sides of the first lowest point 112a. The first optical microstructures 154a are located between the first edge 112b and the first lowest point 112a and are inclined from the first lowest point 112a toward the first edge 112b. In other words, the second substrate 120, the display medium 130 and the first substrate 110 are sequentially stacked in a first direction D1, and the first optical microstructures 154a are inclined towards the first edge 112b. The second optical microstructures 154b are located between the second edge 112c and the first lowest point 112a and are inclined from the first lowest point 112a toward the second edge 112c. The second optical microstructures 154b are inclined towards the second edge 112c, and an inclined direction of the second optical microstructures 154b is opposite to an inclined direction of the first optical microstructures 154a. The third optical microstructures 154c are located in a region 100a where the first lowest point 112a is located. The third optical microstructures 154c are substantially perpendicular to the first concave surface 112 of the first substrate 110.

Further, in the present embodiment, each of the first optical microstructures 154a and the first direction D1 include an angle α1, the angle α1 is increased as the first optical microstructure 154a is away from the first lowest point 112a. Each of the second optical microstructures 154b and the first direction D1 include an angle α2, and the angle α2 is increased as the second optical microstructure 154b is away from the first lowest point 112a. In other words, the farther the optical microstructure 154 is away from the center of the concave display 100, the larger an inclination degree of the optical microstructure 154, though the invention is not limited thereto.

Figure 2:
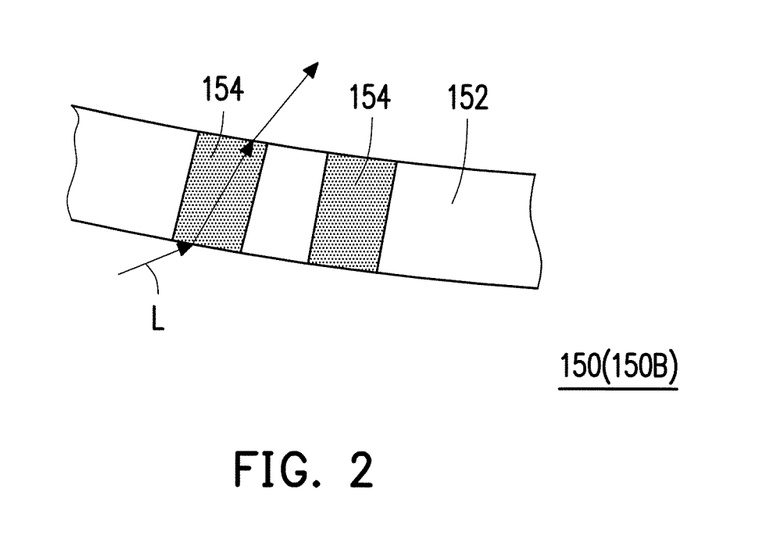
FIG. 2 is a cross-sectional view of a portion of an optical film according to an embodiment of the invention.

FIG. 2 is a cross-sectional view of a portion of an optical film according to an embodiment of the invention. It should be noted that FIG. 2 is an enlarged view of the optical film according to an embodiment of the invention. In detail, FIG. 2 is an enlarged view of a part of the optical film 150 in regions 100b-100e of FIG. 1B. Moreover, a dimension scale of each component in FIG. 2 is only schematic and is not used for limiting the invention. Referring to FIG. 1A, FIG. 1B and FIG. 2, when a light L coming from the first substrate 110 passes through the optical film 150, the light L is deflected by the optical film 150, and the light L originally concentrated to the center is adjusted to deflect towards an edge of the display panel 100. In this way, the problems of the concave display such as color mixing, rainbow stripes, display brightness unevenness, etc., are mitigated.

Figure 3:
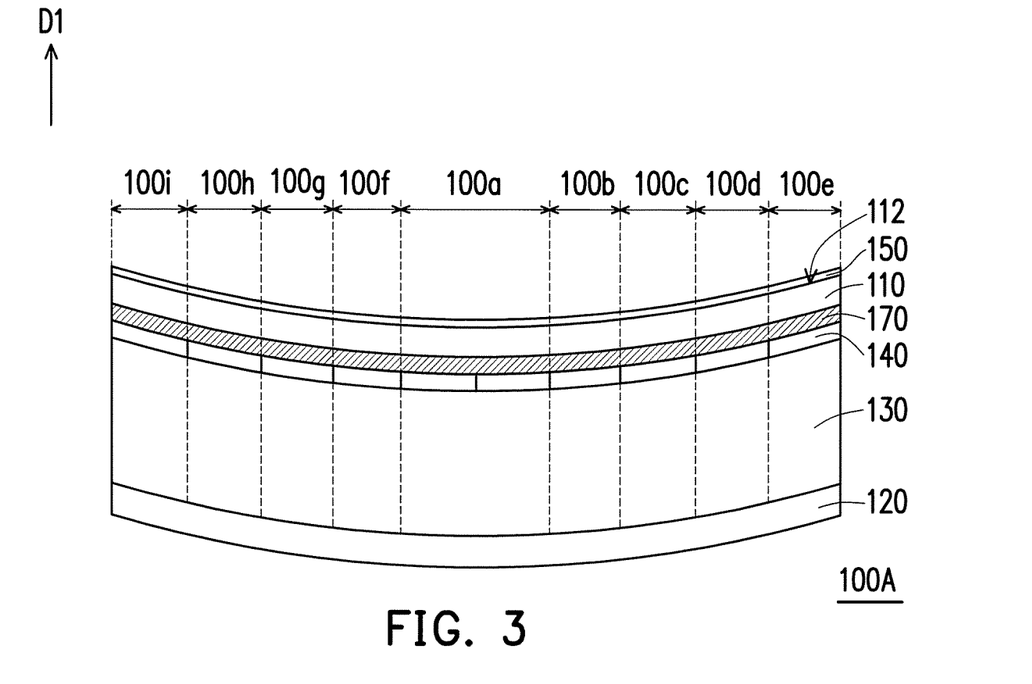
FIG. 3 is a cross-sectional view of a concave display according to another embodiment of the invention.

FIG. 3 is a cross-sectional view of a concave display according to another embodiment of the invention. The concave display 100A of FIG. 3 is similar to the concave display 100 of FIG. 1A, so that the same or corresponding devices are denoted by the same or corresponding referential numbers. A difference between the concave display 100A and the concave display 100 is that a position of the active device layer 170 of the concave display 100A is different to the position of the active device layer 170 of the concave display 100. The above difference is mainly described below, and the same parts of the two concave displays may refer to the aforementioned description, and details thereof are not repeated.

Referring to FIG. 3, the concave display 100A includes the first substrate 110, the second substrate 120, the display medium 130, the color filter layer 140, the optical film 150 and the active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150 includes a base material 152 and a plurality of optical microstructures 154 embedded in the base material 152, where a refractive index of each of the optical microstructures 154 is smaller than a refractive index of the base material 152. Different to the concave display 100, the active device layer 170 is disposed on the first substrate 110, and is not disposed on the second substrate 120. In other words, in the present embodiment, the active device layer 170 and the color filter layer 140 may be disposed on the same substrate to form a color filter on array (COA) structure. The concave display 100A has similar effects and advantages with that of the concave display 100, and details thereof are not repeated.

Figure 4A:
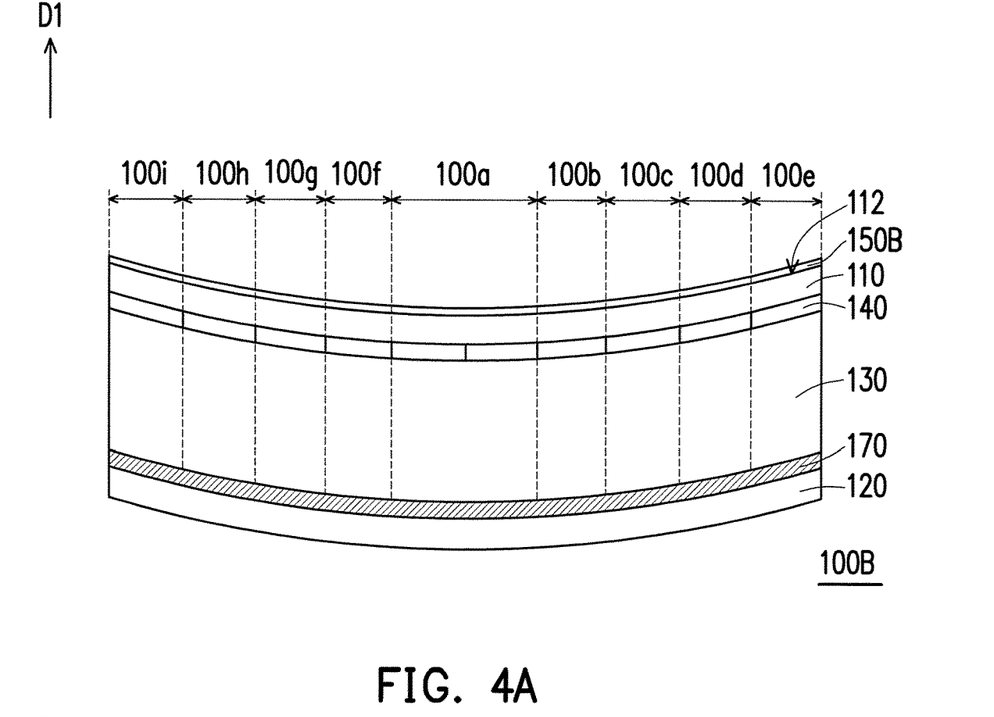
FIG. 4A is a cross-sectional view of a concave display according to still another embodiment of the invention.
Figure 4B:
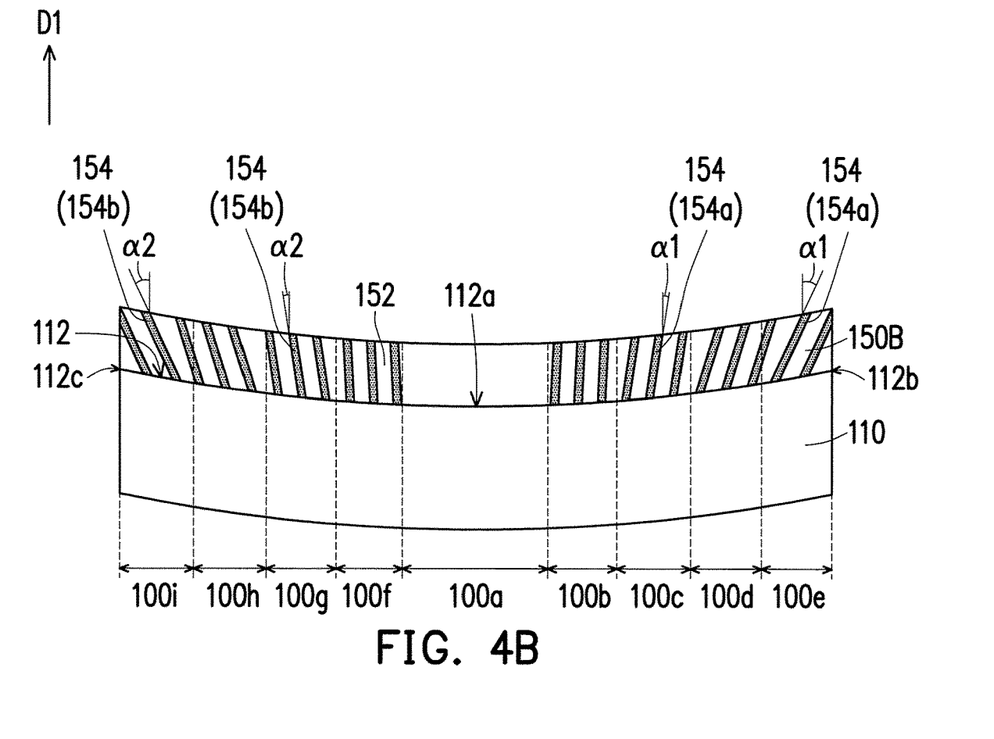
FIG. 4B is a cross-sectional view of a first substrate and an optical film of the concave display of FIG. 4A.

FIG. 4A is a cross-sectional view of a concave display according to still another embodiment of the invention. FIG. 4B is a cross-sectional view of a first substrate and an optical film of the concave display of FIG. 4A. The concave display 100B of FIG. 4A is similar to the concave display 100 of FIG. 1A, so that the same or corresponding devices are denoted by the same or corresponding referential numbers. A difference between the concave display 100B and the concave display 100 is that the optical film 150B of the concave display 100B is different to the optical film 150 of the concave display 100. The above difference is mainly described below, and the same parts of the two concave displays may refer to the aforementioned description, and details thereof are not repeated.

Referring to FIG. 4A and FIG. 4B, the concave display 100B includes the first substrate 110, the second substrate 120, the display medium 130, the color filter layer 140, the optical film 150B and the active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150B includes a base material 152 and a plurality of optical microstructures 154 embedded in the base material 152, where a refractive index of each of the optical microstructures 154 is smaller than a refractive index of the base material 152. The active device layer 170 is disposed on the second substrate 120.

Different to the concave display 100, a distribution density of the optical microstructures 154 in the regions 100b-100e located away from the first lowest point 112a is greater than a distribution density of the optical microstructures 154 in the region 100a located close to the first lowest point 112a, and a distribution density of the optical microstructures 154 in the regions 100f-100i located away from the first lowest point 112a is greater than the distribution density of the optical microstructures 154 in the region 100a located close to the first lowest point 112a. In other words, the more the region is closer to the edge of the concave display 100B, the higher the distribution density of the optical microstructures 154 in the region is, and the more the region is closer to the center of the concave display 100B, the lower the distribution density of the optical microstructures 154 in the region is. In an embodiment, none optical microstructure 154 is disposed in the region 100a close to the first lowest point 112a.

Figure 5A:
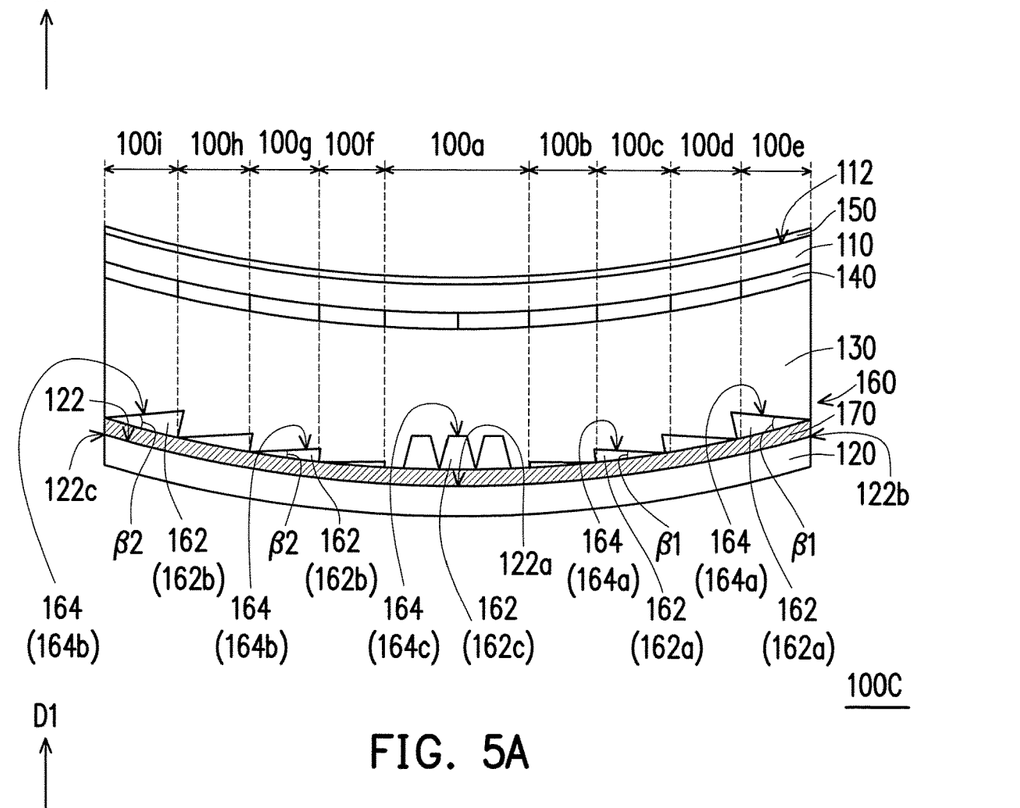
FIG. 5A is a cross-sectional view of a concave display according to still another embodiment of the invention.
Figure 5B:
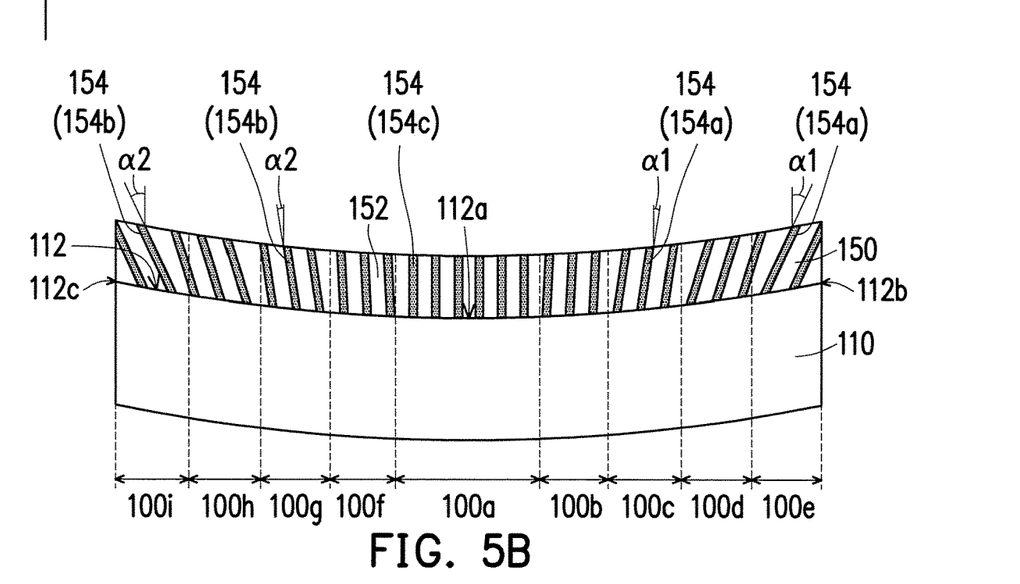
FIG. 5B is a cross-sectional view of a first substrate and an optical film of the concave display of FIG. 5A.

FIG. 5A is a cross-sectional view of a concave display according to another embodiment of the invention. FIG. 5B is a cross-sectional view of a first substrate and an optical film of the concave display of FIG. 5A. The concave display 100C of FIG. 5A is similar to the concave display 100 of FIG. 1A, so that the same or corresponding devices are denoted by the same or corresponding referential numbers. A difference between the concave display 100C and the concave display 100 is that the concave display 100C further includes a reflective layer 160 disposed on the second substrate 120. The above difference is mainly described below, and the same parts of the two concave displays may refer to the aforementioned description, and details thereof are not repeated.

Referring to FIG. 5A and FIG. 5B, the concave display 100C includes the first substrate 110, the second substrate 120, the display medium 130, the color filter layer 140, the optical film 150 and the active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150B includes a base material 152 and a plurality of optical microstructures 154 embedded in the base material 152, where a refractive index of each of the optical microstructures 154 is smaller than a refractive index of the base material 152. The active device layer 170 is disposed on the second substrate 120.

Different to the concave display 100, the concave display 100C further includes the reflective layer 160 disposed on the second substrate 120. The reflective layer 160 includes a plurality of reflective microstructures 162. The reflective microstructures 162 respectively have a plurality of reflective surfaces 164. At least a part of the reflective surfaces 164 are inclined relative to the second substrate 120. In detail, the second substrate 120 has a second concave surface 122, the second concave surface 122 has a second lowest point 122a and a third edge 122b and a fourth edge 122c respectively located at two opposite sides of the second lowest point 122a. The reflective microstructures 162 include a plurality of first reflective microstructures 162a and a plurality of second reflective microstructures 162b. The first reflective microstructures 162a are located between the third edge 122b and the second lowest point 122a, and the second reflective microstructures 162b are located between the fourth edge 122c and the second lowest point 122a. Each of the first reflective microstructures 162a has a first reflective surface 164a, each of the second reflective microstructures 162b has a second reflective surface 164b, and the first reflective surfaces 164a and the second reflective surfaces 164b are inclined relative to the second substrate 120. Further, the first reflective surface 164a of the first reflective microstructure 162a inclines and faces the edge of the concave display 100C, and the second reflective surface 164b of the second reflective microstructure 162b inclines and faces the edge of the concave display 100C, where an inclination direction of the first reflective surface 164a is opposite to an inclination direction of the second reflective surface 164b.

Referring to FIG. 5A and FIG. 5B, in the present embodiment, the first reflective surface 164a and the second substrate 120 include an angle β1, and the angle β1 is increased as the first reflective microstructure 162a is away from the second lowest point 122a. In other words, the farther the first reflective microstructure 162a is away from the center of the concave display 100C, the larger an inclination degree of the first reflective surface 164a is. The second reflective surface 164b and the second substrate 120 include an angle β2, and the angle β2 is increased as the second reflective microstructure 162b is away from the second lowest point 122a. In other words, the farther the second reflective microstructure 162b is away from the center of the concave display 100C, the larger an inclination degree of the second reflective surface 164b is. Moreover, in the present embodiment, the reflective microstructures 162 further include a plurality of third reflective microstructures 162c. The third reflective microstructures 162c are located in a region 100a where the second lowest point 122a is located, where each of the third reflective microstructures 162c has a third reflective surface 164c, and the third reflective surface 164c is substantially parallel to the second substrate 120.

In the present embodiment, the reflective microstructures 162 and the optical microstructures 154 correspond to each other. To be specific, the reflective microstructures 162 located in the region 100a correspond to the optical microstructures 154 located in the same region 100a, the reflective microstructures 162 located in the region 100b correspond to the optical microstructures 154 located in the same region 100b, the reflective microstructures 162 located in the region 100c correspond to the optical microstructures 154 located in the same region 100c, the reflective microstructures 162 located in the region 100d correspond to the optical microstructures 154 located in the same region 100d, the reflective microstructures 162 located in the region 100e correspond to the optical microstructures 154 located in the same region 100e, the reflective microstructures 162 located in the region 100f correspond to the optical microstructures 154 located in the same region 100f, the reflective microstructures 162 located in the region 100g correspond to the optical microstructures 154 located in the same region 100g, the reflective microstructures 162 located in the region 100h correspond to the optical microstructures 154 located in the same region 100h, and the reflective microstructures 162 located in the region 100i correspond to the optical microstructures 154 located in the same region 100i. In brief, the first reflective microstructure 162a with the larger angle β1 corresponds to the first optical microstructure 154a with the larger angle α1, and the second reflective microstructure 162b with the larger angle β2 corresponds to the second optical microstructure 154b with the larger angle α2, and the third optical microstructures 154c parallel to the first direction D1 corresponds to the third reflective microstructures 162c having the third reflective surface 164c parallel to the second substrate 120.

The active device layer 170 includes a plurality of TFTs (not shown), a plurality of scan lines (not shown) electrically connected to gates of the TFTs, and a plurality of data lines (not shown) electrically connected to sources of the TFTs. In the present embodiment, the reflective microstructures 162 are conductive and are electrically connected to the drains of the TFTs. In other words, in the present embodiment, the reflective microstructures 162 may function as pixel electrodes. However, the invention is not limited thereto, and in other embodiment, the reflective microstructures 162 may be independently disposed outside the pixel electrodes.

It should be noted that in the present embodiment, the light from external may be reflected by the reflective microstructures 162 and transmitted to the optical film 150 in a proper direction. In collaboration with a reflection function of the reflective microstructures 162 and a deflection function of the optical film 150, a transmission direction of the light passing through the optical film 150 further approaches to a direction parallel to a line of sight of the user (for example, a direction overlapped to the first direction). In this way, the problems of the conventional technique such as color mixing, rainbow stripes, display brightness unevenness, etc., can be further mitigated.

Figure 6A:
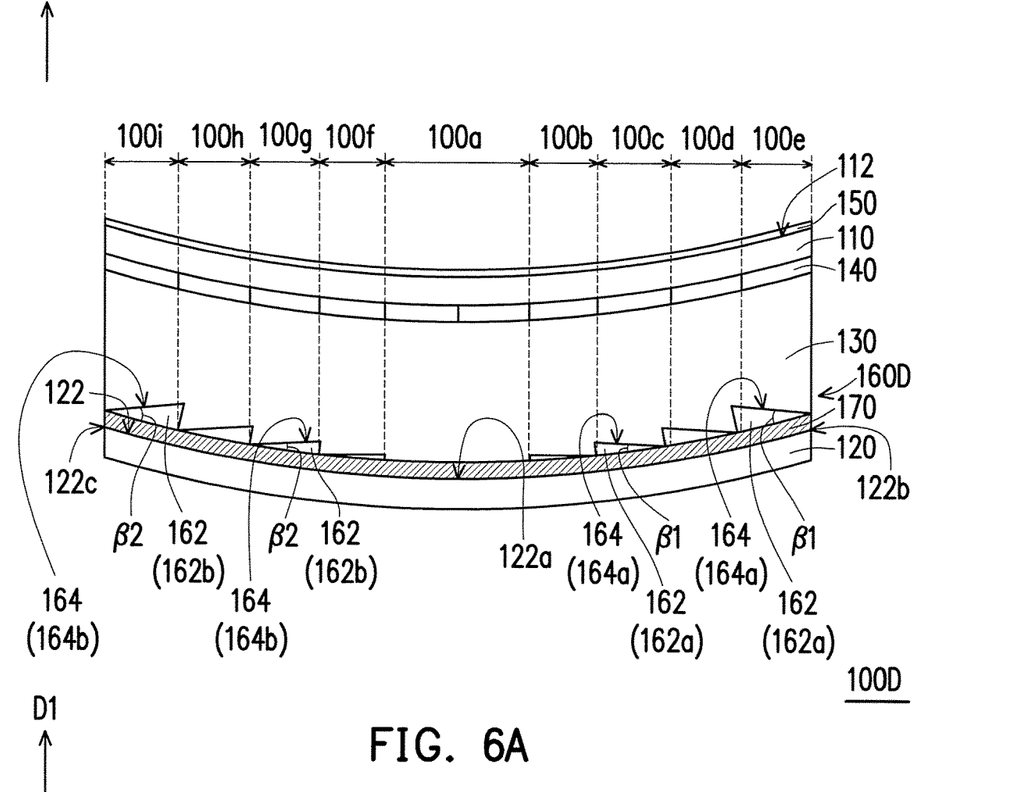
FIG. 6A is a cross-sectional view of a concave display according to still another embodiment of the invention.
Figure 6B:
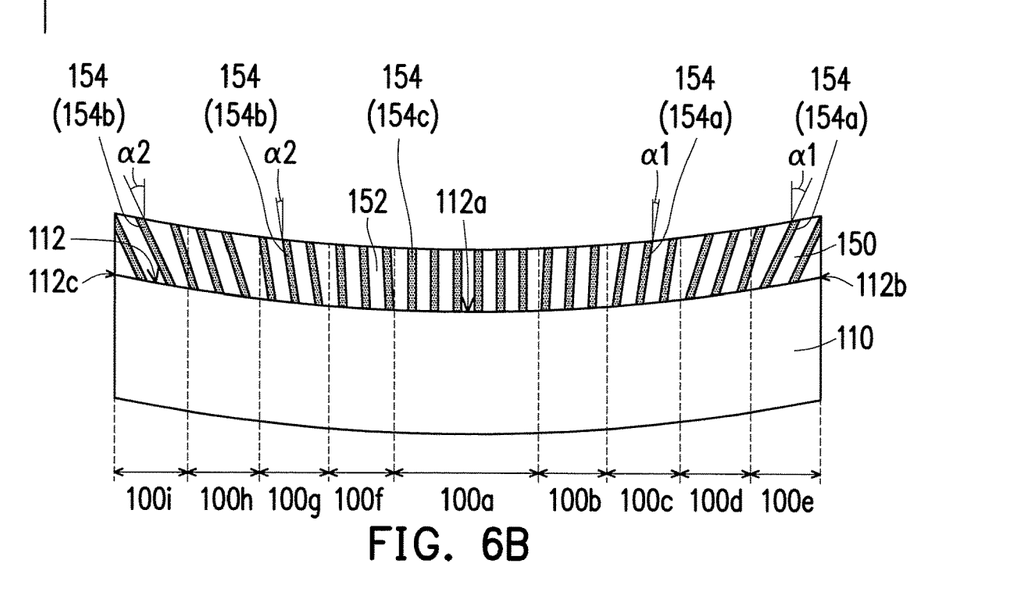
FIG. 6B is a cross-sectional view of a first substrate and an optical film of the concave display of FIG. 6A.

FIG. 6A is a cross-sectional view of a concave display according to still another embodiment of the invention. FIG. 6B is a cross-sectional view of a first substrate and an optical film of the concave display of FIG. 6A. The concave display 100D of FIG. 6A is similar to the concave display 100C of FIG. 5A, so that the same or corresponding devices are denoted by the same or corresponding referential numbers. A difference between the concave display 100D and the concave display 100C is that the reflective layer 160D of the concave display 100D is different to the reflective layer 160 of the concave display 100C. The above difference is mainly described below, and the same parts of the two concave displays may refer to the aforementioned description, and details thereof are not repeated.

Referring to FIG. 6A and FIG. 6B, the concave display 100C includes the first substrate 110, the second substrate 120, the display medium 130, the color filter layer 140, the optical film 150 and the active device layer 170. The second substrate 120 is disposed opposite to the first substrate 110. The display medium 130 is disposed between the first substrate 110 and the second substrate 120. The color filter layer 140 is disposed on the first substrate 110. The optical film 150 is disposed on the first substrate 110, and is farther away from the display medium 130 than the color filter layer 140. The optical film 150B includes a base material 152 and a plurality of optical microstructures 154 embedded in the base material 152, where a refractive index of each of the optical microstructures 154 is smaller than a refractive index of the base material 152. The active device layer 170 is disposed on the second substrate 120.

In the present embodiment, a distribution density of the reflective microstructures 162 in the regions 100b-100e away from the second lowest point 122a is greater than a distribution density of the reflective microstructures 162 in the region 100a close to the second lowest point 122a, and a distribution density of the reflective microstructures 162 in the regions 100f-100i away from the second lowest point 122a is greater than a distribution density of the reflective microstructures 162 in the region 100a close to the second lowest point 122a. In other words, the more the region is closer to the edge of the concave display 100D, the higher the distribution density of the reflective microstructures 162 in the region is, and the more the region is closer to the center of the concave display 100D, the lower the distribution density of the reflective microstructures 162 in the region is. In an embodiment, none reflective microstructure 162 is disposed in the region 100a close to the second lowest point 122a. The concave display 100D and the concave display 100C have the similar effects and advantages, and details thereof are not repeated.

In summary, the concave display of an embodiment of the invention includes the optical film. The optical film includes a base material and a plurality of optical microstructures respectively embedded in the base material, where a refractive index of each of the optical microstructures is smaller than a refractive index of the base material. When a light coming from the display medium passes through the optical film, the light is deflected by the optical film, such that the light originally concentrated to the center of the concave display is adjusted to be deflected towards the edge of the display panel. In this way, the problems of the conventional technique such as color mixing, rainbow stripes, display brightness unevenness, etc., can be mitigated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A concave display, comprising:
   a first substrate;
   a second substrate, disposed opposite to the first substrate;
   a display medium, disposed between the first substrate and the second substrate;
   a color filter layer, disposed on the first substrate;
   an optical film, disposed on the first substrate and located farther away from the display medium than the color filter layer, and the optical film comprising:
      a base material; and
      a plurality of optical microstructures, respectively embedded in the base material, wherein a refractive index of each of the optical microstructures is smaller than a refractive index of the base material; and
   an active device layer, disposed on the first substrate or the second substrate, wherein a light coming from the first substrate passes through the optical film, the light is deflected by the optical film, and the light is deflected towards an edge of the concave display panel.

2. The concave display as claimed in claim 1, wherein at least a part of the optical microstructures are not parallel to each other.

3. The concave display as claimed in claim 1, wherein the first substrate has a first concave surface, the first concave surface has a first lowest point and a first edge and a second edge respectively located at two opposite sides of the first lowest point, and the optical microstructures comprise:
   a plurality of first optical microstructures, located between the first edge and the first lowest point, and inclined from the first lowest point toward the first edge; and
   a plurality of second optical microstructures, located between the second edge and the first lowest point, and inclined from the first lowest point toward the second edge.

4. The concave display as claimed in claim 3, wherein the second substrate, the display medium and the first substrate are sequentially stacked in a first direction, each of the first optical microstructures and the first direction include an angle $\alpha 1$, the angle $\alpha 1$ is increased as the first optical microstructure is away from the first lowest point, each of the second optical microstructures and the first direction include an angle $\alpha 2$, and the angle $\alpha 2$ is increased as the second optical microstructure is away from the first lowest point.

5. The concave display as claimed in claim 3, wherein the second substrate, the display medium and the first substrate are sequentially stacked in a first direction, and the optical microstructures further comprise:
   a plurality of third optical microstructures, located in a region where the first lowest point is located, wherein each of the third optical microstructures is substantially perpendicular to the first concave surface.

6. The concave display as claimed in claim 1, wherein the first substrate has a first concave surface, the first concave surface has a first lowest point, and a distribution density of the optical microstructures in a region away from the first lowest point is greater than a distribution density of the optical microstructures in a region close to the first lowest point.

7. The concave display as claimed in claim 1, wherein the first substrate has a first concave surface, the first concave surface has a first lowest point, and the optical microstructures are not disposed in the region close to the first lowest point.

8. The concave display as claimed in claim 1, further comprising:
   a reflective layer, disposed on the second substrate, wherein the reflective layer comprises a plurality of reflective microstructures, the reflective microstructures respectively have a plurality of reflective surfaces, and at least a part of the reflective surfaces are inclined relative to the second substrate.

9. The concave display as claimed in claim 8, wherein the second substrate, the display medium and the first substrate are sequentially stacked in a first direction, the second substrate has a second concave surface, the second concave surface has a second lowest point and a third edge and a fourth edge respectively located at two opposite sides of the second lowest point, and the reflective microstructures comprise:

a plurality of first reflective microstructures, located between the third edge and the second lowest point, wherein each of the first reflective microstructures has a first reflective surface, and the first reflective surface faces an edge of the concave display; and a plurality of second reflective microstructures, located between the fourth edge and the second lowest point, wherein each of the second reflective microstructures has a second reflective surface, and the second reflective surface faces the edge of the concave display.

10. The concave display as claimed in claim 9, wherein the first reflective surface and the second substrate include an angle $\beta 1$, and the angle $\beta 1$ is increased as the first reflective microstructure is away from the second lowest point; the second reflective surface and the second substrate include an angle $\beta 2$, and the angle $\beta 2$ is increased as the second reflective microstructure is away from the second lowest point.

11. The concave display as claimed in claim 9, wherein the reflective microstructures further comprise:

a plurality of third reflective microstructures, located in a region where the second lowest point is located, wherein each of the third reflective microstructures has a third reflective surface, and the third reflective surface is substantially parallel to the second substrate.

12. The concave display as claimed in claim 9, wherein a distribution density of the reflective microstructures in a region away from the second lowest point is greater than a distribution density of the reflective microstructures in a region close to the second lowest point.

13. The concave display as claimed in claim 9, wherein the reflective microstructures are not disposed in a region close to the second lowest point.

* * * * *